Figure 7:
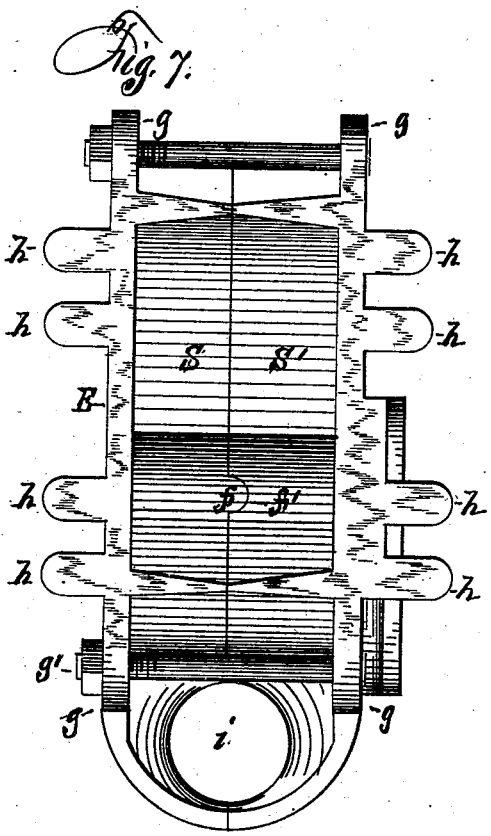

(No Model.) 3 Sheets—Sheet 1.
M. F. CONNETT.
GRAIN DRILL.
No. 289,893. Patented Dec. 11, 1883.
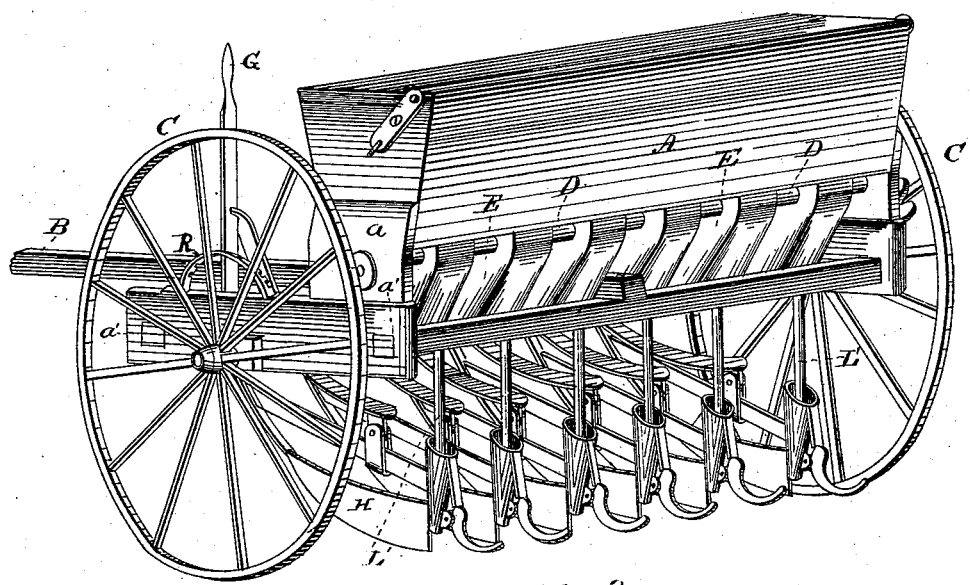
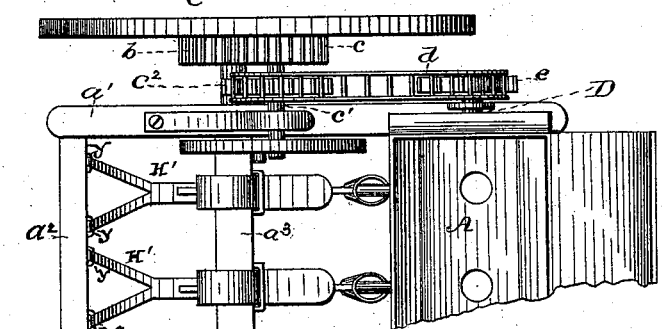
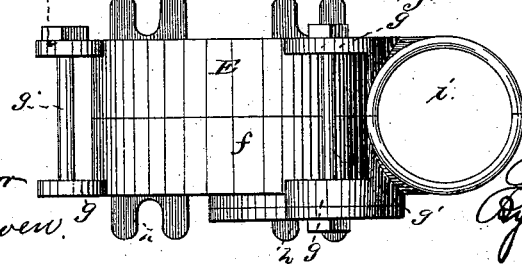
WITNESSES
Chas. R. Burr
W. E. Bowen
INVENTOR
M. F. Connett
By Myers
ATTORNEY

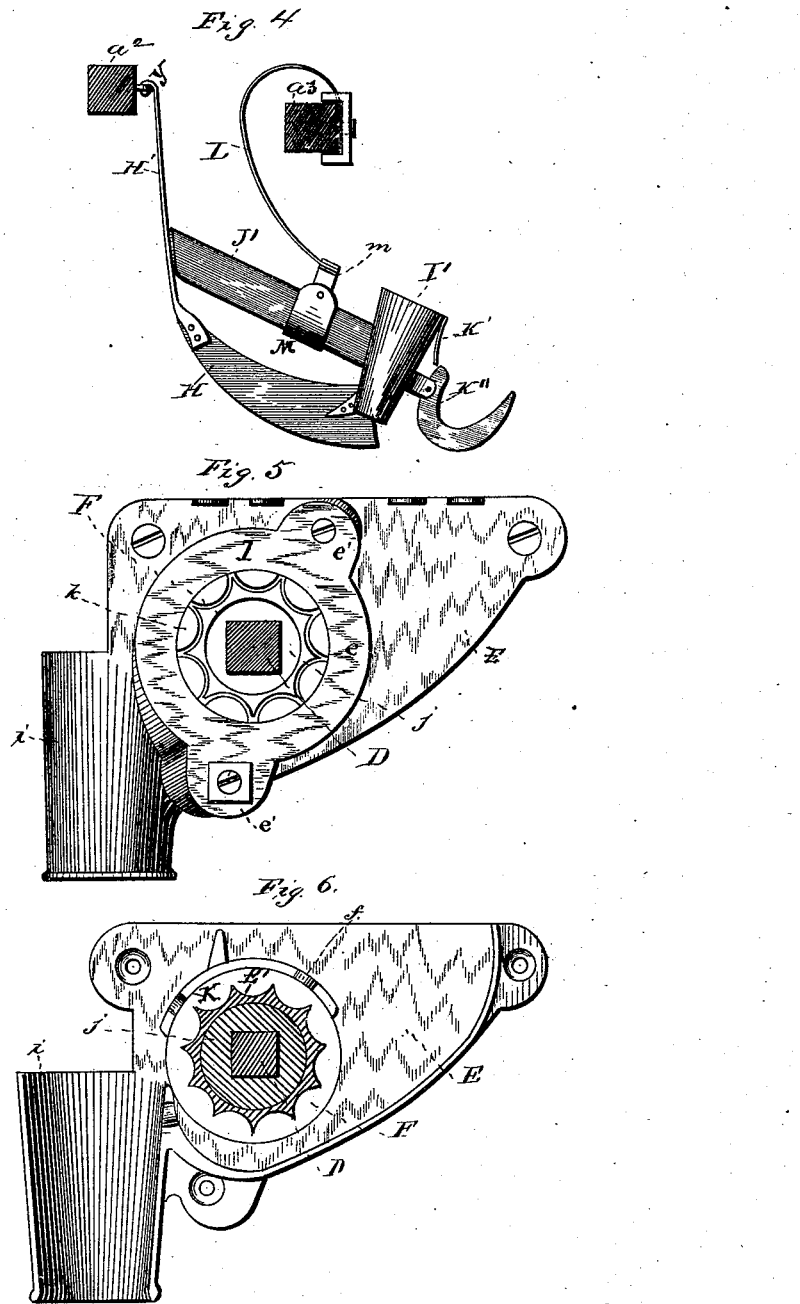

(No Model.) M. F. CONNETT. 3 Sheets—Sheet 3.
GRAIN DRILL.

No. 289,893. Patented Dec. 11, 1883.

WITNESSES
INVENTOR

UNITED STATES PATENT OFFICE.

MATTHEW FRANKLIN CONNETT, OF PETERSBURG, ILLINOIS.

GRAIN-DRILL.

SPECIFICATION forming part of Letters Patent No. 289,893, dated December 11, 1883.

Application filed January 15, 1883. (No model.)

*To all whom it may concern:*

Be it known that I, M. F. CONNETT, a citizen of the United States of America, residing at Petersburg, in the county of Menard and State of Illinois, have invented certain new and useful Improvements in Grain-Drills, of which the following is a specification, reference being had therein to the accompanying drawings.

This invention pertains to improvements in wheat or grain drills, having for its object to cause the easy and effective operation of the several parts of the machine; and it consists in the combination and arrangement of parts, substantially as hereinafter more fully set forth and claimed.

In the accompanying drawings, Figure 1 is a perspective view of my improved wheat or grain drill. Fig. 2 is a plan view broken away, the seed-box being removed. Fig. 3 is also an enlarged, but inverted, plan view of one of the driving-shaft boxes with which the grain boot or spout is formed or cast. Fig. 4 is a detached side view of the drag-bar, shoe or wheel, the lower grain-boot fluke opener, and draw-bar and its spring. Figs. 5 and 6 are detailed views of the feed-wheel cup and tube. Fig. 7 is an enlarged plan view of one of the feed-cups with which the grain boot or spout is formed or cast.

In carrying out my invention I mount the seed-box A by means of short uprights $a$, to which it is fastened, upon the side pieces of a frame, $a'$, said uprights being also fastened to said side pieces of the frame. Across this frame is transversely fastened the tongue B, having secured thereto and projecting at right angles therefrom the axles of the vehicle-wheels C. One of these wheels has a pinion, $b$, secured to it and its axle, and with which engages a second pinion, $c$, on a short shaft, $c'$, suitably journaled upon the frame $a'$. The shaft $c'$ carries a second pinion, $c^2$, around which is passed an endless chain or belt, $d$, also passed around a pinion, $e$, upon the seed-dropping shaft D, and by means of which said shaft is operated to effect the dropping of the seed, grain, or wheat.

To the under side of the bottom of the corn or seed hopper A, in line with openings therein, are fastened boxes E, through which passes the shaft D. The boxes E are each cast in halves, with interlocking tongues and recesses $f f'$ to fit them together, said halves of the boxes being also cast with lugs $g$, through which pass bolts $g'$, to firmly fasten them together, and with slotted flanges or ears $h$, adapted to receive bolts for fastening them to the lower side of the grain or seed hopper A. These boxes are also cast with the nozzle $i$, divided also into halves, a half being cast with each half of a box. The shaft D is fitted with a cylinder, $j$, upon which, in turn, is fitted a hollow fluted cylinder, E', all being arranged within the cup attached to the under side of the seed or corn hopper to feed the wheat or seed into the nozzle $i$, said fluted cylinder having its bearing in an internally-scalloped ring or annulus, $k$, said annulus bearing in an annular socket formed by a ring, $l$, having an inwardly-projecting correspondingly-shaped flange. This ring has also apertured lugs $e'$, through which are passed bolts fastening the same to the cup E. It will be noticed that this construction permits the ready removal of the seed-dropping shaft, and at the same time affords a separate bearing therefor in each box, and one that revolves with the shaft to reduce friction. A hand-lever, G, is secured to axle $a^3$, and, in connection with the curved rack R, is employed to elevate or lower the runners or openers H H out of the ground.

H H are the runners or openers, with their forward ends connected by springs H' to the frame $a^2$, while upon their rear ends are secured the "flukes" I', into which enter the lower ends of the seed boots or spouts L', the upper ends of said spouts or boots being secured to the nozzles $i$ of the cups E. The flukes are secured at their front sides to the drag-bar fastened to the springs H'. Affixed to the rear sides of the flukes I' are projections or lugs, between or to which are pivoted the covering-shoes K'', with their upwardly-projecting forward ends acted upon by springs K', fastened to the flukes. This spring-pressure holds the shoes or coverers and the openers down to their work, and at the same time enables them to readily ride over impediments or obstructions.

L is also a spring, clipped at its upper end, as clearly seen in Fig. 4, to the rear side of a cross-piece of the frame $a^3$, and thence curved or carried above and forward of said cross-piece, and downward and rearward, its lower end having a downward-projecting plate or bar, $m$, attached to it. To this projection or plate is pivoted or hung a loop or clip, M, through which passes the drag-bar J'. This arrangement of parts brings the strain on the axles, (the pressure of the spring being exerted upon the drag-bars about in line with the axles,) and the reciprocal upward reaction of the spring lessens the draft of the horses, while the clip M is adapted to slide on the drag-bar and adjust itself to the inclination of the latter as it varies its position in sinking into the soil and riding over clods or impediments, which prevents binding of the clips on the bar. The weight of the axles is sufficient to hold the openers and coverers in the ground. The forward ends of each of the springs H' are forked where they are connected to the cross-bar of frame $a^2$, (see Fig. 2,) and bent to form eyes, through which project the staples Y Y, which construction prevents their lateral movement and admits the vertical oscillation of the runners H.

I am aware that it is not broadly new to construct the seed-shaft box in two sections, nor to construct a seed-shaft box in connection and combination with a cylinder and fluted collars; nor is it broadly new to construct a shoe or opener connected by a spring to the frame of the drill and in connection with a covering-shoe; but

What I claim, and desire to secure by Letters Patent, is—

1. The combination of the runners H, spring H', having eyes for staples Y Y, frame $a^2$, covering-shoes K'', spring K', frame $a^3$, and spring L, clipped to frame-bar $a^3$ and drag-bar J', substantially as shown, and for the purpose described.

2. The combination of the runners H, springs H', secured to frame $a^2$, covering-shoes K'', spring K', spring L, clipped to frame-bar $a^3$, plate or bar $m$, loop or clip M, and drag-bar J', substantially as shown, and for the purpose described.

In testimony whereof I affix my signature in presence of two witnesses.

MATTHEW FRANKLIN CONNETT.

Witnesses:
  FRANK MCDOUGALL,
  A. I. BROOKS.